(12) United States Patent
Hierholzer et al.

(10) Patent No.: US 7,415,520 B2
(45) Date of Patent: Aug. 19, 2008

(54) METHOD FOR ESTABLISHING A CONNECTION WITH A PREDETERMINED SERVICE QUALITY BETWEEN COMMUNICATIONS NETWORKS WITH RESOURCE MANAGERS

(75) Inventors: Peter Hierholzer, Wielenbach (DE);
Karl Klaghofer, München (DE);
Harald Müller, Gilching (DE);
Christian Prehofer, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 599 days.

(21) Appl. No.: 10/344,096

(22) PCT Filed: Jul. 27, 2001

(86) PCT No.: PCT/DE01/02857

§ 371 (c)(1),
(2), (4) Date: Mar. 24, 2003

(87) PCT Pub. No.: WO02/13456

PCT Pub. Date: Feb. 14, 2002

(65) Prior Publication Data

US 2003/0163572 A1    Aug. 28, 2003

(30) Foreign Application Priority Data

Aug. 9, 2000    (DE) ............................... 100 38 878

(51) Int. Cl.
*G06F 15/173* (2006.01)
*G06F 15/16* (2006.01)

(52) U.S. Cl. .................... 709/227; 709/223; 709/230

(58) Field of Classification Search ................ 370/352, 370/443, 467; 709/223, 227, 230
See application file for complete search history.

(56) References Cited

U.S. PATENT DOCUMENTS

| | | | | |
|---|---|---|---|---|
| 5,459,871 A * | 10/1995 | Van Den Berg | ............. | 718/104 |
| 6,411,623 B1 * | 6/2002 | DeGollado et al. | ....... | 370/395.1 |
| 6,522,660 B1 * | 2/2003 | Mukaihara et al. | .......... | 370/443 |
| 6,738,361 B1 * | 5/2004 | Immonen et al. | ............ | 370/328 |
| 6,910,074 B1 * | 6/2005 | Amin et al. | .................. | 709/227 |
| 7,010,801 B1 * | 3/2006 | Jerding et al. | .................. | 725/95 |
| 2002/0159442 A1 * | 10/2002 | Quigley et al. | .............. | 370/352 |

FOREIGN PATENT DOCUMENTS

WO    WO 99/27686    6/1999

OTHER PUBLICATIONS

Xiao et al., "Internet QoS: A Big Picture", IEEE Network, Mar./Apr. 1999, pp. 8-18.

(Continued)

*Primary Examiner*—Ario Etienne
*Assistant Examiner*—Hussein A El Chanti
(74) *Attorney, Agent, or Firm*—Staas & Halsey LLP

(57) ABSTRACT

A method establishes a connection between a source network with a source network resource manager and a target network with a target network resource manager. According to the method, a connection control unit of the source network transmits a connection establishment signal to a connection control unit of the target network and—parallel to this—a reservation request to the target network resource manager. The target network resource reserves the requested resources and forwards the reservation request towards the target network resource manager, which also reserves the requested resources and transmits reservation information regarding the success of the resource reservations to the connection control unit of the target network.

20 Claims, 2 Drawing Sheets

OTHER PUBLICATIONS

Neilson et al., "A Discussion of Bandwidth Broker Requirements for Internet2 Qbone Deployment", Internet2 Qbone BB Advisory Council, Aug. 1999, pp. 1-30.

Dalgic et al., "Comparison of H.323 and SIP for IP Telephony Signaling", Part of the SPIE Conference on Multimedia Systems and Applications II, Boston, Massachusetts, Sep. 1999, PSIE vol. 3875, pp. 106-122.

* cited by examiner

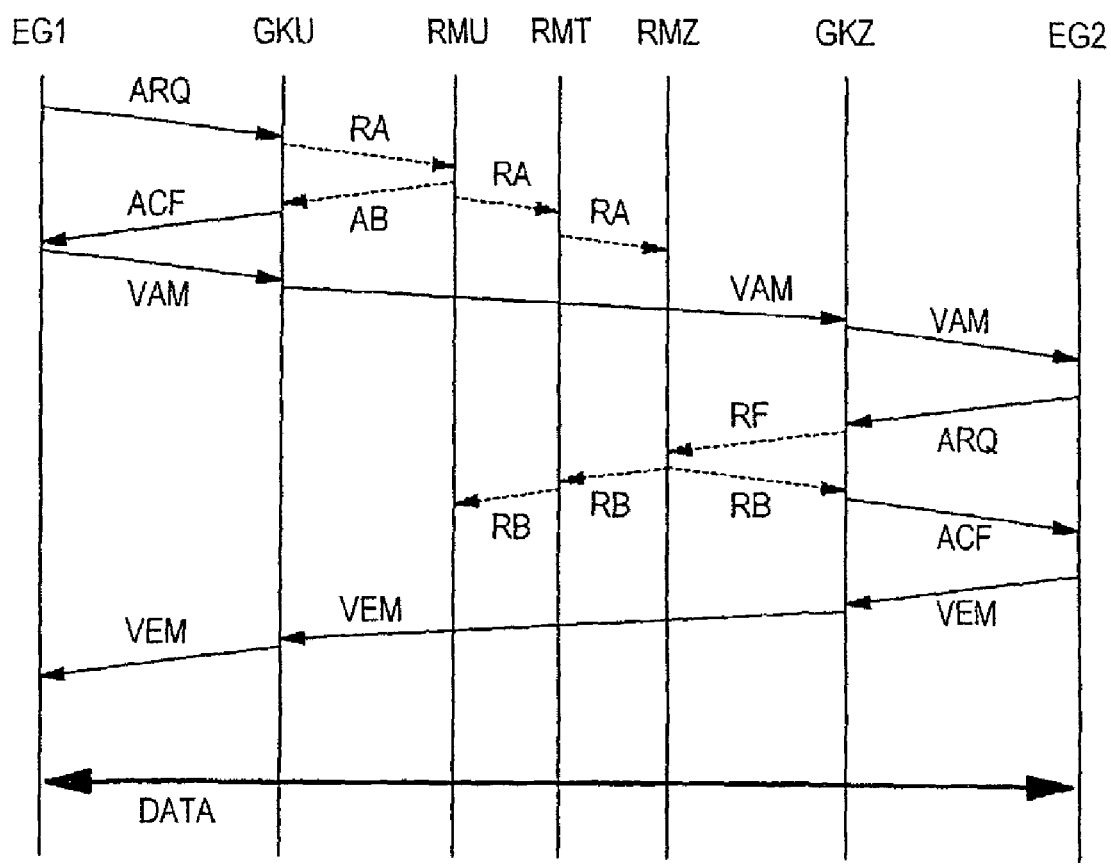

METHOD FOR ESTABLISHING A CONNECTION WITH A PREDETERMINED SERVICE QUALITY BETWEEN COMMUNICATIONS NETWORKS WITH RESOURCE MANAGERS

CROSS REFERENCE TO RELATED APPLICATIONS

This application is based on and hereby claims priority to PCT Application No. PCT/DE01/02857 filed on 27 Jul. 2001 and German Application No. 100 38 878.7 filed on 9 Aug. 2000, the contents of which are hereby incorporated by reference.

BACKGROUND OF THE INVENTION

In many widely used packet-oriented communications networks, for example in the Internet, no Qualities of Service are guaranteed for connections between terminals in these communications networks unless additional precautions are taken. The Quality of Service (QoS) of a connection may cover various transmission and connection parameters, such as the transmission bandwidth, the transmission speed, the permissible error rate and/or the transmission duration.

In present-day communications systems, which are frequently based on such packet-oriented communications networks, so-called resource managers are provided in order to ensure a predetermined Quality of Service. These resource managers are in each case associated with a communications network or a network element, and administer their respective transmission resources. A resource manager may in each case reserve transmission resources, which can be predetermined, on a connection-specific basis for connections which are to be set up. Once transmission resources have been successfully reserved, the resource manager then monitors the permanent availability of the reserved transmission resources for the respective connection.

In many cases, the start point and end point of a connection are not in the same communications network or network element, so that the connection has to pass via a plurality of communications networks. In order to reserve predetermined transmission resources for such a connection, these resources must be reserved separately in each individual communications network or network element that is involved in the connection.

According to known methods, this is done by transmitting a reservation request to the resource manager for that communications network which is closest to the connection destination on the route. This resource manager attempts to make an appropriate resource reservation in its communications network and, if successful, transmits the reservation request further to that resource manager which is responsible for the next communications network on the connection route. This resource manager carries out the same procedure, and the reservation request is passed on until either a corresponding resource reservation fails in one communications network or until the reservation request reaches the resource manager which is responsible for the destination communications network. If the resource reservation is successful, this last resource manager transmits an acknowledgement message via all the resource managers involved, back to the initiator of the connection in the first communications network. The initiator of the connection then causes the connection to be set up via the individual communications networks. One such method is described, by way of example, in the Internet draft "A Discussion of Bandwidth Broker Requirements for Internet2 Qbone Deployment", Version 7, R. Neilson, J. Wheeler, F. Reichmeyer, S. Hares (Editors) dated August 1999, http://www.merit.edu/working.groups/i2-qbone-bb/doc/BBReq7.pdf, 10.7.2000, in particular on pages 12 and 13.

In this known method, the process of setting up a connection via a plurality of communications networks is, however, delayed considerably owing to the complex signalling. Particularly in the case of connections via the Internet, which comprises a large number of individual communications networks, this has been found to be highly disadvantageous.

SUMMARY OF THE INVENTION

One possible object of the present invention is to specify a method which allows connections to be set up quickly with a guaranteed Quality of Service, even via a plurality of communications networks.

The method according to one aspect of the invention may allow a connection which passes via a plurality of communications networks to be set up considerably more quickly than in the case of known methods, with a guaranteed Quality of Service. The Quality of Service may in this case relate to widely differing transmission resources, such as the transmission bandwidth, transmission speed, permissible error rate, transmission delay and/or any other desired Quality of Service parameter, possibly on a priority-class specific basis.

Faster setting up of connections is dependent, inter alia, on reservation information relating to the success of the resource reservations being transmitted in the individual communications networks from a destination network resource manager directly to a connection controller in the destination network. Time-consuming backward transmission of this reservation information from the destination network resource manager via the source network resource manager to a connection controller for the source network and signalling for setting up connections that is not carried out until this has been done, by the connection controller in the source network—as in the known methods—are thus avoided. In the method, the resource reservation process is carried out by the resource managers in the individual communications networks, and the connection-setting-up signalling is carried by the connection controllers in the source network and in the destination network, to a certain extent in parallel.

A so-called gatekeeper can be provided in each case as the connection controller in the source network and/or in the destination network, for logical connection control, connection inspection, connection monitoring and/or for logical setting up and clearing of connections.

According to one advantageous embodiment, the connection controller for the destination network can be caused by the transmission of the connection setting-up message to check the reservation information relating to the success of the resource reservations by the destination network resource manager. If this reservation information is not yet available when first checked, the check may be carried out repeatedly, if necessary. In this case, a maximum number of repetitions and/or a maximum time interval can be specified, after which the further setting up of the connection is terminated. As soon as the reservation information is available in the destination network resource manager, the reservation information is stored by the destination network resource manager until it is checked by the connection controller in the destination network.

There may be one or more further communications networks, which each have their own resource manager, between the source network and the destination network, via which the connection that is to be set up must be passed. In this case, the reservation request must be transmitted via all the further resource managers who are responsible for the intermediate communications networks, to the destination network resource manager. The route on which the reservation request is in this case transmitted may preferably be defined by the resource managers involved or else solely by the source network resource manager on the basis of transmitted address information which identifies a connection destination. The source network resource manager and/or the further resource managers may be provided with access to routing tables for this purpose. The address information which identifies the connection destination may preferably be transmitted by the connection controller in the source network to the source network resource manager in the course of the reservation request process.

Furthermore, reservation information relating to the success of a resource reservation may also be transmitted back to the source network resource manager by the destination network resource manager, in addition to being transmitted to the connection controller in the destination network. In this way, the source network resource manager and possibly all the intermediate resource managers as well are informed of a successful resource reservation along the entire connection route. This information can be assessed by the resource managers in order to optimize their resource administration.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 2 shows a flowchart in order to illustrate the signalling traffic when setting up the connection.

DETAILED DESCRIPTION OF THE PREFERRED EMBODIMENT

Figure 1:
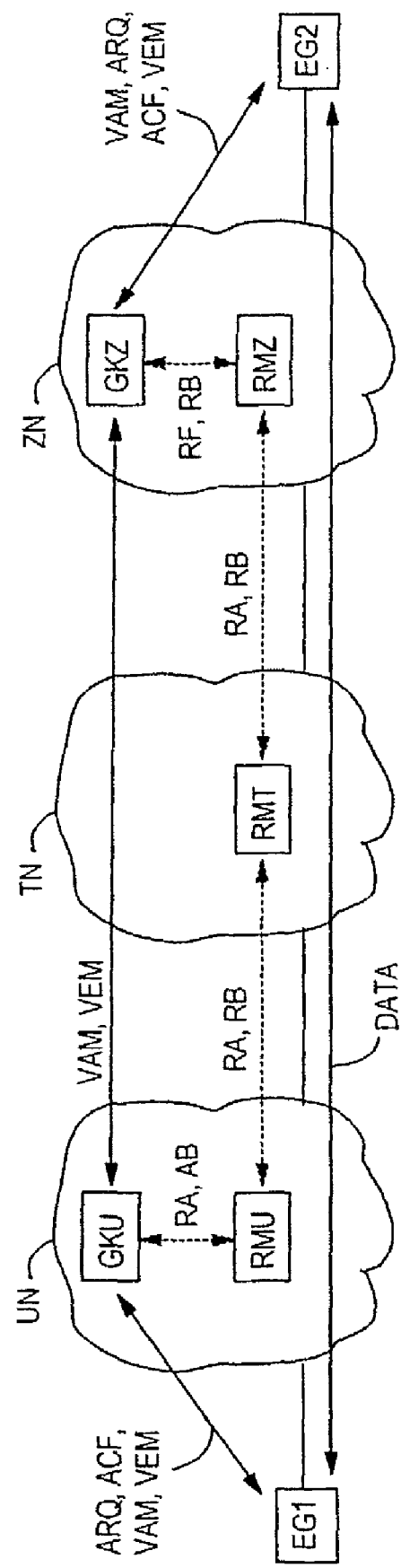
FIG. 1 shows a communications system having three network elements, which each have a resource manager and via which a connection with a guaranteed Quality of Service is set up.

Reference will now be made in detail to the preferred embodiments of the present invention, examples of which are illustrated in the accompanying drawings, wherein like reference numerals refer to like elements throughout.

FIG. 1 shows a schematic illustration of the communications system with three communications network elements UN, TN and ZN, which are preferably Internet-protocol based. The individual communications network elements are referred to in the following text as the source network UN, the transit network TN and the destination network ZN. The source network UN is coupled to the transit network TN, which is in turn coupled to the destination network ZN. In order to administer transmission resources, a source network resource manager RMU is arranged in the source network UN, the transit network resource manager RMT is arranged in the transit network TN, and a destination network resource manager RMZ is arranged in the destination network ZN. The resource managers RMU, RMT and RMZ are responsible in their respective communications network elements UN, TN and ZN, respectively, for the reservation of transmission resources for connections to be set up as well as for ensuring the Quality of Service of connections which have been set up. The transmission resources and the Qualities of Service may in this case relate to quite different transmission parameters, such as a maximum or mean transmission bandwidth, a transmission delay and/or transmission error rate. For all the connections which require a Quality of Service guarantee in one or more communications network elements UN, TN, ZN, the corresponding transmission resources must be requested from the respectively responsible resource manager UN, TN or ZN, and must be released once again once the connection has been cleared.

Furthermore, a terminal EG1 is coupled to the source network UN, and a terminal EG2 is coupled to the destination network ZN. The terminals EG1 and EG2 may in this case be any desired communications terminals, for example for speech, video and/or data communication, or else may be in the form of a personnel computer. The source network UN furthermore has an associated so-called gatekeeper GKU, and the destination network ZN has a gatekeeper GKZ. The gatekeepers GKU and GKZ are responsible for logical control, that is to say for setting up and clearing as well as monitoring connections, in the respectively associated network element UN or ZN. In the present exemplary embodiment, the gatekeepers GKU and GKZ comply with the ITU T Standard H.323. According to a further embodiment, it is possible to provide for the gatekeepers GKU and GKZ to support the so-called SIP protocol CSIP: Session Initiation Protocol) in accordance with IETF Standard.

In the present exemplary embodiment, the process of setting up a connection, for example for speech transmission (VoIP: Voice over Internet Protocol) is considered, with a guaranteed Quality of Service from the terminal EG1 to the terminal EG2. In the course of this process of setting up a connection, connection setting-up signalling takes place via the gatekeepers GKU and GKZ and, in parallel with this, a resource reservation is made via the resource managers RMU, RMT and RMZ.

Logical signalling channels are set up for connection setting-up signalling between the terminal EG1 and the gatekeeper GKU, between the gatekeeper GKU and the gatekeeper GKZ, and between the gatekeeper GKZ and the terminal EG2. The logical signalling channels for connection setting-up signalling are illustrated by solid double arrows in FIG. 1. The connection setting-up signalling is preferably carried out in accordance with ITU-T Recommendation H.323v2. This type of connection setting-up signalling is frequently also referred to as "fast connect".

Furthermore, logical signalling channels are also set up for resource reservation between the gatekeeper GKU and the source network resource manager RMU, between the source network resource manager RMU and the transit network resource manager RMT, between the transit network resource manager RMT and the destination network resource manager RMZ, as well as between the destination network resource manager RMZ and the gatekeeper GKZ. The logical signalling channels for resource reservation are each indicated by dashed double arrows in FIG. 1.

The sequence for the signalling traffic for setting up connections and for resource reservation will be explained in more detail in the following text with reference to FIG. 2. FIG. 2 shows a flowchart of the signalling traffic between the terminals EG1 and EG2, the gatekeepers GKU and GKZ, as well as the resource managers RMU, RMT and RMZ. By analogy with FIG. 1, the signalling messages which have to be transmitted in the course of connection setting-up signalling are indicated by solid arrows, and the signalling messages which have to be transmitted in the course of resource reservation are indicated by dashed arrows. In this case, the arrow direction in each case indicates the transmission direction. Mutually corresponding objects have the same reference symbols in FIG. 1 and FIG. 2. The time axis in FIG. 2 runs from top to bottom.

The terminal EG1 initiates the setting up of a connection by transmitting an access request message ARQ (Admission Request) to the gatekeeper GKU. The access request message ARQ contains, inter alia, target address information which identifies the destination terminal EG2, for example its call number, as well as Quality of Service information which indicates the Quality of Service required for that connection. The gatekeeper GKU then initiates a reservation of transmission resources on the basis of the transmitted Quality of Service information. For this purpose, the gatekeeper GKU transmits an appropriate reservation request message RA to the source network resource manager RMU. The destination address information which identifies the destination terminal EG2 is transmitted to the source network resource manager RMU, inter alia together with the reservation request message RA. The source network resource manager RMU then acknowledges to the gatekeeper GKU that it has received the reservation request message RA, by transmitting a request acknowledgement message AB. However, the reservation itself is not acknowledged. In fact, the reservation is implemented only substantially, to be precise in parallel with the setting up of the connection via the gatekeepers GKU and GKZ.

In the course of the reservation of the transmission resources, the source network resource manager RMU first of all checks whether the requested transmission resources are still available in the source network UN. If this is the case, these transmission resources are reserved for the connection that is to be set up. In addition, the source network resource manager RMU uses the transmitted destination address information to determine that or those communication network element or elements, in this case TN and ZN, via which the connection is to be set up to the destination terminal, in this case EG2. In the process, the respectively responsible resource managers, in this case RMT and RMZ, are also determined.

If the resource reservation in the source network UN is successful, the source network resource manager RMU transmits a resource request message RA to the transit network resource manager RMT. The latter first of all checks whether the requested transmission resources are still available in the transit network TN. If this is the case, the requested transmission resources are reserved, and a reservation request message RA is transmitted to the destination network resource manager RMZ. The latter also first of all checks the availability of the requested transmission resources in the destination network ZN and, if successful, reserves the transmission resources.

Since the resource request message RA is in each case passed on only if the resource reservation has been successful, it is possible to assume when the resource request message RA arrives at the destination network resource manager RMZ that the resource reservation has been successful along the route of the connection to be set up passing all the way to the destination network ZN. An alternative option for informing the destination network resource manager RMZ of the success of the resource reservation is to transmit separate reservation information to the destination network resource manager RMZ, indicating the respective success of a resource reservation process.

In parallel with the resource reservation, the gatekeeper GKU continues the process of setting up the connection in that, after receiving the request acknowledgement message AB, it transmits an admission confirmation message ACF to the terminal EG1. This then transmits—still without any acknowledgement of successful resource reservation—a connection setting-up message VAM (set-up) to the gatekeeper GKU, which passes on the connection setting-up message GAM to that gatekeeper GKZ which is determined on the basis of the destination address information. In the process, the gatekeeper GKU also transmits information to the gatekeeper GKZ which indicates that a resource reservation is being made in parallel with the connection setting-up signalling. The connection setting-up message VAM is transmitted on from the gatekeeper GKZ to the terminal EG2. In consequence, the terminal EG2 transmits an access request message ARQ to the gatekeeper GKZ, which then sends a reservation checking message RF to the destination network resource manager RMZ, in order to confirm successful resource reservation. Provided that the resource reservation in the destination network resource manager RMZ—and hence also in the resource managers RMU and RMT—has been successful, the destination network resource manager RMZ transmits a reservation acknowledgement message RB to the gatekeeper GKZ and to the resource managers RMU and RMT. Once the gatekeeper GKZ has received the reservation acknowledgement message RB, it sends an admission confirmation message ACF to the terminal EG2, in response to which the terminal EG2 initiates the connection that is to be set up, by connection initiation messages VEM. The connection initiation messages VEM are transmitted via the gatekeepers GKZ and GKU to the terminal EG1, and preferably comprise a so-called call preceding message, a so-called alerting message and a so-called connect message. Once these connection initiation messages VEM have been transmitted, the connection is set up, so that pay load data DATA can be interchanged between the terminals EG1 and EG2 via the network elements UN, TN and ZN.

This additional transmission of the reservation acknowledgement message RB to the resource managers RMU and RMT results in them being informed that the reserve resources are also actually being used. For the resource managers RMT and RMU, it is also preferable to pre-set a time interval for the arrival of the reservation acknowledgement message RB, with the reservation being cancelled if this time interval is exceeded.

If, when the gatekeeper GKZ checks the resource reservation, the reservation has not yet been made in the destination network resource manager RMZ, the check may be repeated, if necessary, a number times, by transmitting further reservation request messages RF. Furthermore, a time interval can be pre-set, during which the gatekeeper GKZ waits for a reservation acknowledgement message RB to arrive. If no reservation acknowledgement message RB has been transmitted from the destination network resource manager RMZ to the gatekeeper GKZ for the connection to be set up, after repeated checking and/or after the pre-set time interval has elapsed, the gatekeeper GKZ ends the process of setting up this connection.

The invention has been described in detail with particular reference to preferred embodiments thereof and examples, but it will be understood that variations and modifications can be effected within the spirit and scope of the invention.

The invention claimed is:

1. A method for setting up a connection with a predetermined Quality of Service from a source network with a source network resource manager to a destination network different from the source network, the destination network having a destination network resource manager, the method comprising:

initializing the connection by transmitting both a connection setting-up message and a reservation request in the course of connection setting-up signaling, the connection setting-up message being transmitted from a connection controller in the source network to a connection controller in the destination network, and the reservation request being transmitted from the connection controller in the source network to the source network resource manager;

initiating a resource reservation in the source network on the basis of the reservation request;

transmitting the reservation request from the source network resource manager toward the destination network resource manager;

initiating a resource reservation in the destination network on the basis of the reservation request transmitted from the source network, the resource reservation being initiated by the destination network resource manager; and transmitting reservation information relating to the success of the resource reservation, from the destination network resource manager to the connection controller in the destination network wherein the resource manager of the source network and the resource manager of the destination network both reserve transmission resources of their respective networks on a connection-specific basis and monitor the permanent availability of resources reserved, and the connection controller of the source network and the connection controller of the destination network both perform logical connection control and logical setting-up and clearing down of connections.

2. The method as claimed in claim 1, wherein the connection setting-up message causes the connection controller in the destination network to poll the reservation information relating to the success of the resource reservations.

3. The method as claimed in claim 1, wherein the connection controller in the destination network continues setting up the connection only if the reservation information indicates a successful resource reservation.

4. The method as claimed in claim 1, wherein the source network resource manager transmits reservation information in the direction of the destination network source manager relating to the success of the resource reservation in the source network.

5. The method as claimed in claim 1, wherein the reservation request is transmitted from the source network resource manager toward the destination network resource manager only in the event of a successful resource reservation in the source network.

6. The method as claimed in claim 1, wherein the reservation request is transmitted from the source network resource manager to the destination network resource manager via at least one further resource manager, which is responsible for a connecting path between the source network and the destination network.

7. The method as claimed in claim 1, wherein the source network resource manager identifies at least one other network resource manager, which is responsible for a connecting path between the source network and the destination network, on the basis of address information which identifies a connection destination.

8. The method as claimed in claim 1, wherein the connection controller in the source network signals to the connection controller in the destination network that a resource reservation is being made.

9. The method as claimed in claim 1, wherein the reservation information relating to the success of the resource reservations is transmitted by the destination network resource manager to the source network resource manager.

10. The method as claimed in claim 1, wherein ITU-T Standard H.323 is used for signalling between the connection controller in the source network and the connection controller in the destination network.

11. The method as claimed in claim 1, wherein the SIP protocol in accordance with the IETF Standard is used for signalling between the connection controller in the source network and the connection controller in the destination network.

12. The method as claimed in claim 2, wherein the connection controller in the destination network continues setting up the connection only if the reservation information indicates a successful resource reservation.

13. The method as claimed in claim 12, wherein the source network resource manager transmits reservation information in the direction of the destination network source manager relating to the success of the resource reservation in the source network.

14. The method as claimed in claim 13, wherein the reservation request is transmitted from the source network resource manager toward the destination network resource manager only in the event of a successful resource reservation in the source network.

15. The method as claimed in claim 14, wherein the reservation request is transmitted from the source network resource manager to the destination network resource manager via at least one further resource manager, which is responsible for a connecting path between the source network and the destination network.

16. The method as claimed in claim 15, wherein the source network resource manager identifies at least one other network resource manager, which is responsible for a connecting path between the source network and the destination network, on the basis of address information which identifies a connection destination.

17. The method as claimed in claim 16, wherein the connection controller in the source network signals to the connection controller in the destination network that a resource reservation is being made.

18. The method as claimed in claim 17, wherein the reservation information relating to the success of the resource reservations is transmitted by the destination network resource manager to the source network resource manager.

19. The method as claimed in claim 18, wherein ITU-T Standard H.323 is used for signalling between the connection controller in the source network and the connection controller in the destination network.

20. The method as claimed in claim 18, wherein the SIP protocol in accordance with the IETF Standard is used for signalling between the connection controller in the source network and the connection controller in the destination network.

* * * * *